US006691118B1

United States Patent
Gongwer et al.

(10) Patent No.: US 6,691,118 B1
(45) Date of Patent: Feb. 10, 2004

(54) CONTEXT MANAGEMENT SYSTEM FOR MODULAR SOFTWARE ARCHITECTURE

(75) Inventors: R. Scott Gongwer, Acton, MA (US); Charles P. Venezia, Jr., Marlborough, MA (US); Kurt Larson, Watertown, MA (US); James E. Carey, Brookline, MA (US)

(73) Assignee: Oracle International Corporation, Redwood Shores, CA (US)

( * ) Notice: Subject to any disclaimer, the term of this patent is extended or adjusted under 35 U.S.C. 154(b) by 710 days.

(21) Appl. No.: 08/961,743

(22) Filed: Oct. 31, 1997

(51) Int. Cl.$^7$ .......................... G06F 17/30; G06F 12/00
(52) U.S. Cl. ........................ 707/100; 707/3; 711/156; 711/173; 711/209
(58) Field of Search ............................. 707/1, 3, 104, 707/100; 705/37; 710/260; 395/676, 677; 711/118, 141, 147, 148, 153, 156, 173, 205, 206, 209

(56) References Cited

U.S. PATENT DOCUMENTS

| | | | | |
|---|---|---|---|---|
| 5,097,533 A | * | 3/1992 | Burger et al. | 709/302 |
| 5,276,879 A | * | 1/1994 | Barry et al. | 395/676 |
| 5,339,392 A | | 8/1994 | Risberg et al. | 395/161 |
| 5,339,415 A | * | 8/1994 | Strout, II et al. | 709/102 |
| 5,345,588 A | * | 9/1994 | Greenwood et al. | 709/107 |
| 5,421,016 A | | 5/1995 | Conner et al. | 395/700 |
| 5,452,459 A | * | 9/1995 | Drury et al. | 707/3 |
| 5,504,898 A | * | 4/1996 | Klein | 709/101 |
| 5,511,192 A | * | 4/1996 | Shirakihara | 395/676 |
| 5,515,538 A | * | 5/1996 | Kleiman | 710/260 |
| 5,574,903 A | | 11/1996 | Szymanski et al. | 395/601 |
| 5,590,326 A | * | 12/1996 | Manabe | 711/150 |
| 5,651,111 A | | 7/1997 | McKeeman et al. | 395/183.14 |
| 5,659,752 A | | 8/1997 | Heisch et al. | 395/704 |
| 5,787,452 A | * | 7/1998 | McKenna | 707/536 |
| 5,812,848 A | | 9/1998 | Cohen | 395/685 |
| 5,812,852 A | * | 9/1998 | Poulsen et al. | 717/6 |
| 5,852,731 A | * | 12/1998 | Wang et al. | 709/100 |
| 5,873,071 A | * | 2/1999 | Ferstenberg et al. | 705/37 |
| 5,884,022 A | * | 3/1999 | Callsen et al. | 714/22 |
| 5,893,912 A | * | 4/1999 | Freund et al. | 707/103 |
| 5,951,653 A | * | 9/1999 | Hill et al. | 709/304 |
| 6,058,460 A | * | 5/2000 | Nakhimovsky | 711/153 |

OTHER PUBLICATIONS

Petzold, C., *Programming Windows 95*, The Definitive Developer's Guide to the Windows 95 API, Microsoft Press, (1996). Chapter 19, "Dynamic Link Libraries," pp 959–985, Chapter 20, "What's This Thing Called Ole?", pp 987–1060.

\* cited by examiner

*Primary Examiner*—Hani M. Kazimi
*Assistant Examiner*—Ella Colbert
(74) *Attorney, Agent, or Firm*—Hamilton, Brook, Smith & Reynolds, P.C.

(57) ABSTRACT

A context management system manages both thread-local data and free-thread data in a flexible modular architecture. Thread data is segmented into an ordinal workspace structure. In a free thread architecture, each module can have its own private and public segments. The context management system allows many threadable, session contexts to share a lesser number of real operating system threads, maintained as a thread pool within the server process.

78 Claims, 8 Drawing Sheets

CONTEXT MANAGEMENT SYSTEM FOR MODULAR SOFTWARE ARCHITECTURE

BACKGROUND

In a large scale computer system, such as a database management system (DBMS), it is important to be able to service a number of different users concurrently. Without such a capability, the system would be little more than a standalone computer. To implement multi-user support, several different processing models have been utilized. One model that has been used is the multi-processing model. In multi-processing, each time a new user requests access to the system, a separate process is started. This process is in essence a separate execution of the software. Once started, the process services all of the requests from the user that spawned it. Under the multi-processing model, each process has its own separate memory space for use in storing and processing data.

Multi-processing is effective for supporting multiple users concurrently; however, it has severe scalability limitations. This is due mainly to two factors. First, spawning and maintaining a process involves a significant amount of overhead. Because of the high cost, only a small number of processes can be maintained at any one time. Second, the same set of data, used by multiple processes, may be stored redundantly; once in each process' memory space. This redundancy can waste a significant amount of system resources.

To overcome some of the limitations of multi-processing, the multi-thread model was developed. According to the multi-thread model, there is only one execution of the software. That is, only one process is spawned. From this one process, multiple threads can be spawned to perform the work necessary to service user requests.

Multi-threading has several advantages over multi-processing. First, because only one process is spawned, overhead is kept to a minimum. It is true that each thread carries with it some overhead cost, but this cost is negligible when compared with the cost of maintaining an entire process. Because multi-threading significantly reduces system overhead, many more users can be supported. Another advantage of multi-threading is that it minimizes the redundant storage of data. Because all of the threads are part of the same process, all of the threads can share the same memory space, and other system resources associated with that process.

A typical method of constructing an executable computer program to support concurrent users includes compiling a plurality of source code files into machine-code object files. These object files are then linked together at build time to yield a tightly-coupled monolithic executable image. For complex applications, the executable can be quite large. Although monolithic executables operate efficiently, they have a number of drawbacks, including difficulty in programming, constructing, testing, and modifying the software.

SUMMARY OF THE INVENTION

In accordance with preferred embodiments of the invention, a context management system manages both thread-local data and free-thread data in a flexible modular architecture. Preferably, thread data is segmented into an ordinal workspace structure. In a free thread architecture, each module can have its own private and public segments. The context management system allows many threadable, session contexts to share a lesser number of real operating system threads, maintained as a thread pool within the server process.

In accordance with a preferred embodiment of the invention, a multi-session computing system is programmed with a system for managing session context. First, a computer program is concurrently executable by a plurality of sessions. In particular, the computer program comprises a plurality of linked modules, each module programmed with a subset of the computer program. The modules are linked in a preassigned order to yield the computer program. The sessions are initiated by a plurality of clients, a module provides the interface between the computer program and a client.

Each session can include a plurality of transactions. A thread manager is included to assign computing threads to sessions. In a particular embodiment, a free-thread pool is managed by the thread manager.

A plurality of data segments are generated and accessible to the computer program for storing session data. A data segment can include a private subset of data and a public subset of data.

A database structure relates each session with at least one data segment to provide each session access to the stored session data. The database structure preferably includes an array of pointers to the data segments to bind a module with a data segment. A database manager module associates the database structure with the session data, the modules and the data segments. That association is provided by a computed index into the database structure.

The above and other features of the invention, including various novel details of construction and combination of parts, will now be more particularly described with reference to the accompanying drawings and pointed out in the claims. It will be understood that the particular system for dynamically constructing an executable computer program embodying the invention is shown by way of illustration only and not as a limitation of the invention. The principles and features of this invention may be embodied in varied and numerous embodiments without departing from the scope of the invention.

DETAILED DESCRIPTION OF PREFERRED EMBODIMENTS OF THE INVENTION

Figure 1:
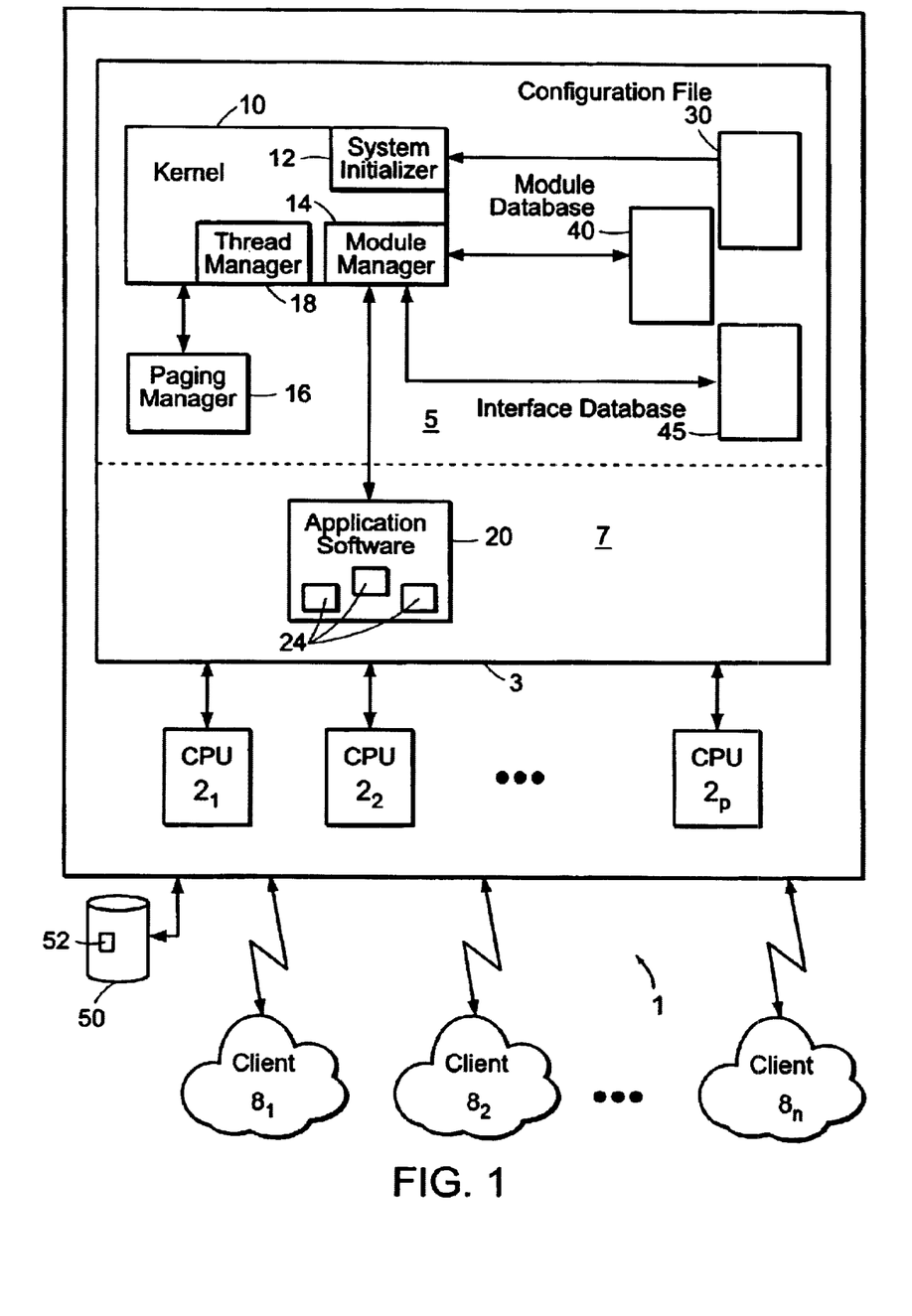
FIG. 1 is a schematic block diagram of a computing system in accordance with a preferred embodiment of the invention.

FIG. 1 is a schematic block diagram of a computing system in accordance with a preferred embodiment of the invention. Illustrated is a host computer system 1 having a plurality of Central Processing Units (CPU) $2_1, 2_2, \ldots, 2p$ for executing program instructions from a software architecture 3. The software architecture 3 includes a server operating system environment 5 and an application environment 7. In the operating system environment, an operating system kernel 10 comprises a system initializer 12 and a module manager 14. The system initializer 12 and the module manager 14 are employed to construct an application software program 20 in the application environment 7 from a plurality of modules 24. In a particular preferred embodiment of the invention, the application software program 20 is a server-based on-line analytical processing (OLAP) program which communicates with a paging manager 16 to access data stored in databases 52 on a disk 50.

The user sessions and system management processes preferably include processing threads managed by the thread manager 18 in a multi-threaded OLAP engine. That is, user sessions can accomplish tasks by asynchronously executing processing threads. In particular, the thread manager 18 preferably manages a free thread pool having a plurality of pre-instantiated computing threads.

Embodiments of the invention preferably take the form of computer executable instructions embedded in a computer-readable format on a CD-ROM, floppy disk or hard disk, or another computer-readable distribution medium. These instructions are executed by one or more processors $2_1, 2_2, \ldots, 2p$ to implement the system software and OLAP software. Particular embodiments of the invention are commercially available as Express Server, Versions 6.0, 6.0.1, 6.0.1.2, and 6.1, from Oracle Corporation.

The system initializer 12 is automatically executed once the kernel 10 is established on the host computer 1. The initializer 12 responds to configuration information from a configuration file 30 which has been created by a system administrator. The configuration file 30 lists all relevant modules 24 making up the application software program 20 and where the module files are located on disk. The system initializer 12 reads the configuration information and loads the modules that make up the application software program 20 into memory.

Once the modules 24 are loaded, the module manager 14 is executed to dynamically construct the modules into an operational set of code (i.e., the application software 20) by performing a number of different functions. The module manager 14 creates and maintains a module database 40 and an interface database 45. The module database 40 is essentially a list, derived from the configuration file 30, of all the modules 24 making up the application software program 20.

The module manager 14 calls each of the modules to register each of the interfaces that the module supports into an interface database 45. Information that is registered includes the name of the interface and the pointer to the interface.

As the term is used herein, a module is a subset of object files and functionality that are linked together. Each module has a bootstrapping entry point or an exportable method called modMain. A module is preferably dynamically loadable and can be included in a function library with an entry point.

Each module also provides at least one interface for services. An interface provides a binary contact point between a supplier method and a consumer method. These complete interfaces are registered with the central interface database 45. Each module and interface is identified using a burned-in, universally unique identifiers (UUID). Typically, each module references one or more interfaces registered by other modules via the interface database 45. The modules can also provide a mechanism to dynamically cope with missing interfaces in the code image. Modules support standard callback interfaces for all management functions.

In addition, a module can support thread-local data (i.e., workspace) operations and can be optimized for multi-threaded operations. Modules also store and present version validation information. The modules also provide for dynamic integrity checks of process and thread run-time data integrity.

A module also has an organized code structure, clear functionality boundaries and highly-encapsulated data organization. Modules support global (process-oriented) constructors and destructors for appropriate initialization and termination processing. Similarly, the modules can support thread data-oriented constructors and destructors for appropriate initialization and termination processing. The modules also provide ordinality for coordinating global, thread local and error recovery processing across modules.

Figure 2:
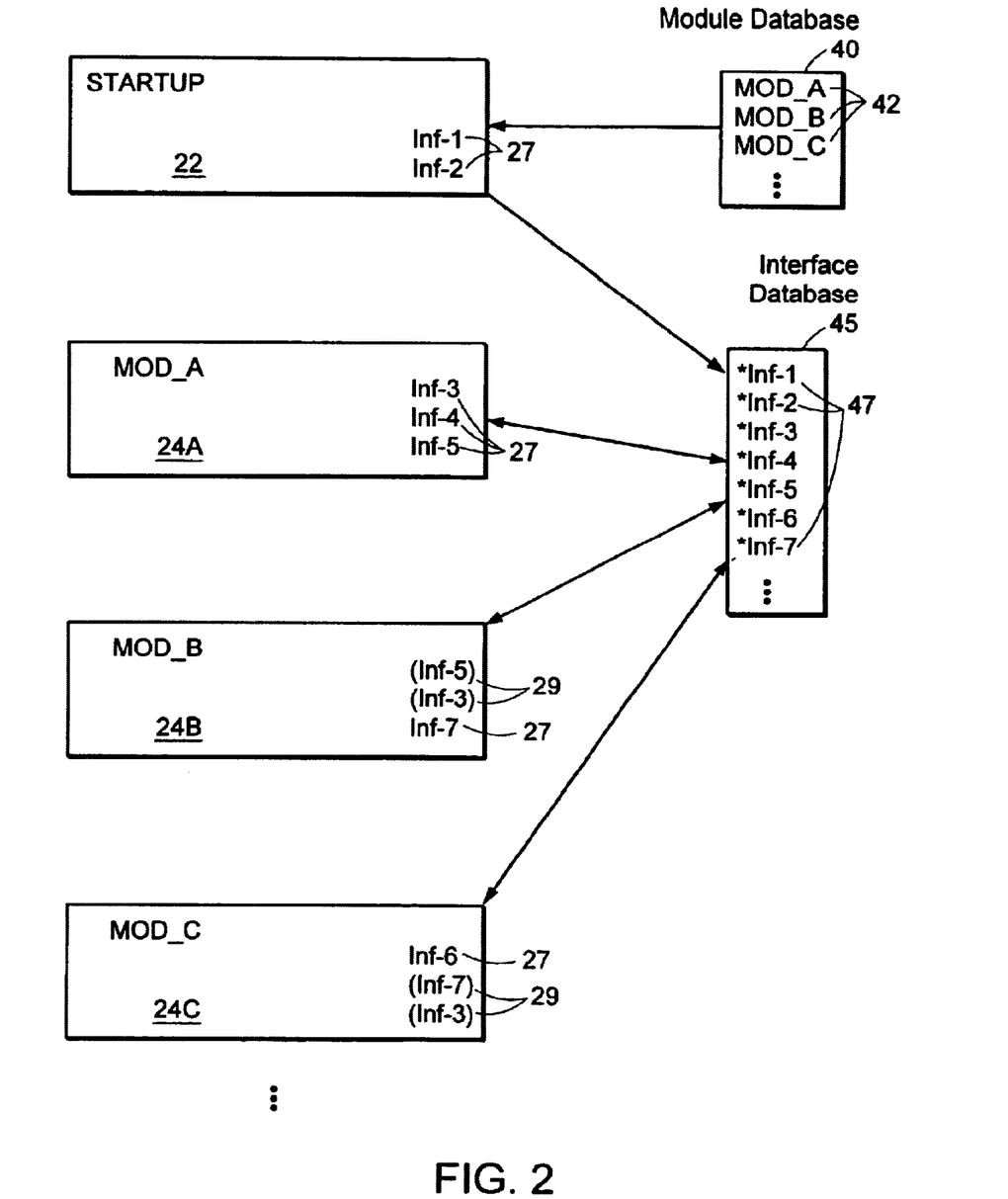
FIG. 2 is a schematic block diagram of module registration and resolution in accordance with a preferred embodiment of the invention.

FIG. 2 is a schematic blockldiagram of module registration and resolution in accordance with a preferred embodiment of the invention. As illustrated, there is a startup module 22 and a plurality of worker modules 24. Each module 22, 24 can define function method interfaces 27 or reference method interfaces 29 defined by other modules. The module database 40 includes a list of module entries 42 and the interface database 45 includes a list of pointers 47 to registered interfaces.

As illustrated, the startup module 22 defines two interfaces, Inf_1 and Inf_2. The identifiers for these interfaces along with the pointers to the function entry points for these interfaces are stored as entries 47 in the interface database 45.

A first worker module (MOD_A) 24A defines three interfaces, Inf_3, Inf_4 and Inf_5. Pointers to these interfaces are stored by the module manager as entries 47 in the interface database 45.

A second worker module (MOD_B) 24B defines one interface, Inf_7, and references two interfaces, Inf_5 and Inf_3. A pointer for the defined interface is stored in the interface database 37. Similarly, a third worker module (MOD_C) 24C defines a single interface, Inf_6, and references interfaces Inf_7 and Inf_3.

Note that the module database 40 specifies in what order the modules are loaded. In particular, the modules are loaded in an order such that interface references are always to an interface which has already been enabled for execution at a later, precise state of software initialization.

After the registration process, the module manager 14 recognizes all interfaces that are supported by the application software 20 and how those interfaces can be located and invoked. Thereafter, the module manager 14 resolves all of the interfaces for all the modules. In this process, the module manager provides to each module, for each interface that the module needs, a pointer to the needed interface. The interface references 29 are thereby dereferenced using the pointers stored in the interface database 45 for the respective interfaces. By so doing, the module manager 14 is tightly binding all the modules together by way of the pointers into a single set of executable code. The software is thus dynamically constructed.

Figure 3:
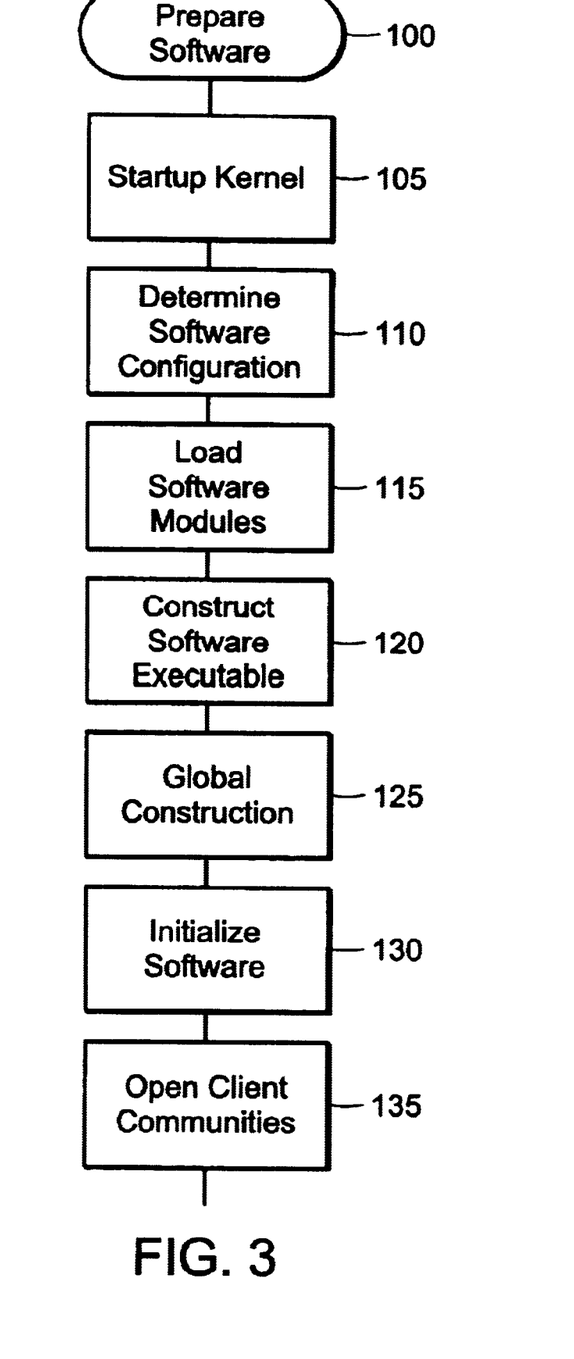
FIG. 3 is a flowchart of a preferred method of preparing an executable software program in accordance with the invention.

FIG. 3 is a flowchart of a preferred method of preparing an executable software program in accordance with the invention. At step 105, the kernel 10 is started by the host server computer operating system. At step 110, the kernel 10 executes the system initializer 12, which determines the software configuration of the executable image of a target software application from the configuration file 30. At step 115, the system initializer 12 loads the required software modules into memory. At step 120, the module manager constructs an executable image for the target software. At step 125, the system constructs the global system to make the modules runnable. In particular, the module manager 14 calls each module to execute a global construction method. At step 130, the target software is initialized. Finally, at step 135 the kernel 10 resolves every external interface (Remote Procedure Call (RPC), Express Communications Architecture (XCA), Remote Oracle, etc.) to open the client communities for access to the target software.

Figure 4:
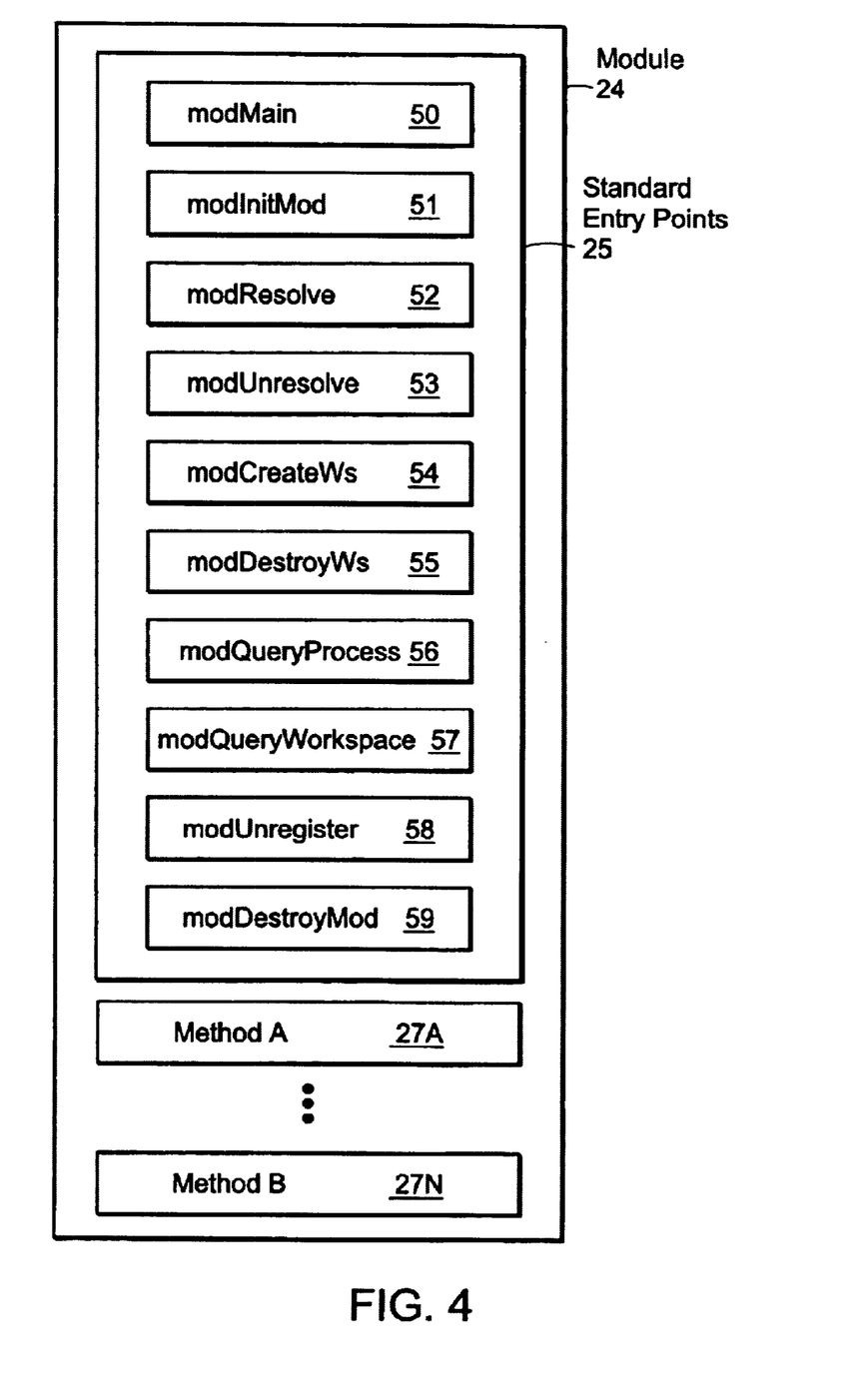
FIG. 4 is a schematic block diagram of a typical module in accordance with a preferred embodiment of the invention.

FIG. 4 is a schematic block diagram of typical module in accordance with a preferred embodiment of the invention. Each module 24 preferably includes a plurality of standard entry points 25, modMain 50, modInitMod 51, modResolve 52, modUnresolve 53, modCreateWs 54, modDestroyWs 55, modQueryProcess 56, modQueryWorkspace 57, modUnregister 58, and modDestroyMod 59. The modMain 50 function verifies the module and registers the interfaces. The modInitMod function 51 is a global constructor for the module. The modResolve function 52 is invoked to resolve module interfaces. The modUnresolve function 53 is called to unresolve a single interface. The modCreateWs function 54 is a constructor for thread-local (workspace) data. The modDestroyWs function 55 is a destructor of the thread-local (workspace) data. The modQueryProcess function 56 is invoked to query module integrity. The modQueryWorkspace function 57 is called to query workspace integrity. The modUnregister function 58 is invoked to unregister all defined interfaces of the module. The modDestroyMod function 59 is a global destructor.

In addition to the standard entry point 25, a module 24 can include a plurality of service methods 27a, . . . ,27n each having a respective interface. Further details and advantages of dynamically constructing an executable computer program from modules are described in U.S. patent Ser. No. 08/866,744 entitled "System For Dynamically Constructing an Executable Computer Program" and filed on May 30, 1997 by R. Scott Gongwer et al., the teachings of which are incorporated herein by reference in their entirety.

Figure 5:
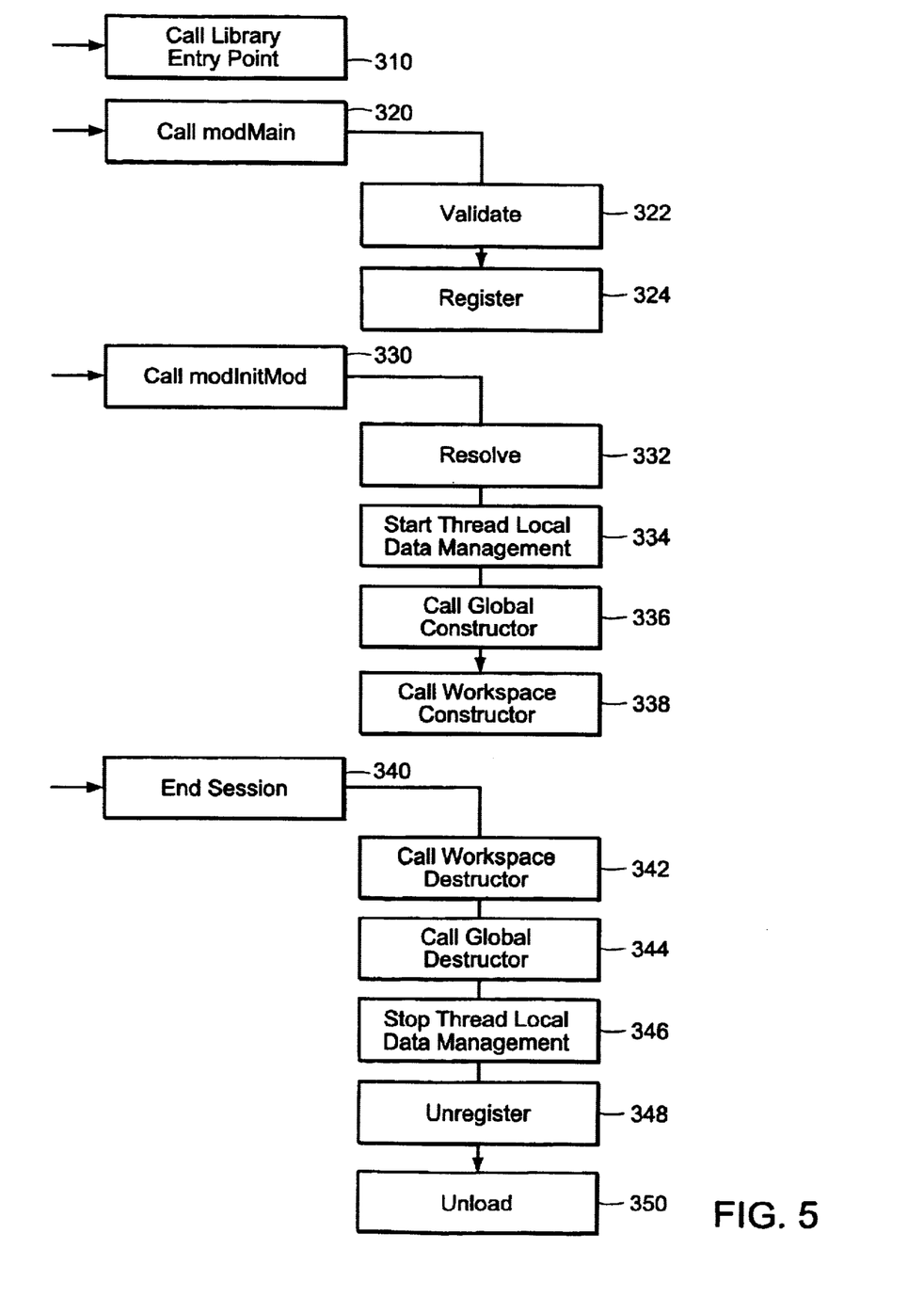
FIG. 5 is a process flow diagram for typical module operations in accordance with a preferred embodiment of the invention.

FIG. 5 is a process flow diagram for typical module operations in accordance with a preferred embodiment of the invention. First, at step 310 the operating system calls the dynamic library entry point for the module. At step 320, the module manager now calls modMain, which causes the module to validate itself at step 322 using the module version data and to register all the interfaces it provides at step 324. In particular, all modules register a common module interface and possibly a common thread local data interface.

The module manager next calls the global constructor, modInitMod, at step 330. In response, at step 332 the module resolves external interfaces provided by other modules. The module then starts thread-local data management for the module at step 334. Each module now calls its global constructor (modInitMod) to initialize process-level data at step 336 and a workspace constructor (modCreateWs) to initialize thread-level data at step 338.

At the end of the last transaction for a session (step 340), each module calls its workspace destructor (modDestroyWs) to deinitialize thread-level data at step 342. Each module then calls its global destructor (modDestroyMod) to deinitialize process-level data at step 344. Each module then stops thread-local data management for the module at step 346. Each module then unregisters all the interfaces it provides by calling modunregister at step 348 and, finally, unloads itself from the process code image at step 350.

By employing dynamic software construction, service interfaces can be separated from fixed modules. Interfaces are thus portable and can be migrated from one module to another. In other words, module boundaries can be adjusted or redefined to include or exclude a particular service. In addition, multiple generations of a service can operate in a single executable application program.

Also, any session creation, transaction, or destruction can execute using any thread within the process. To be effective, each thread must have context information regarding the session data to access to accomplish a task. In a free-thread environment it is particularly difficult to maintain context.

In a preferred embodiment of the invention, a workspace structure is utilized to control session context. As briefly described above, the workspace structure is controlled by modules. The modules can provide a template for initializing the workspace, a constructor for private workspaces, a destructor for private workspaces, and a routine to query private workspaces.

Figure 6:
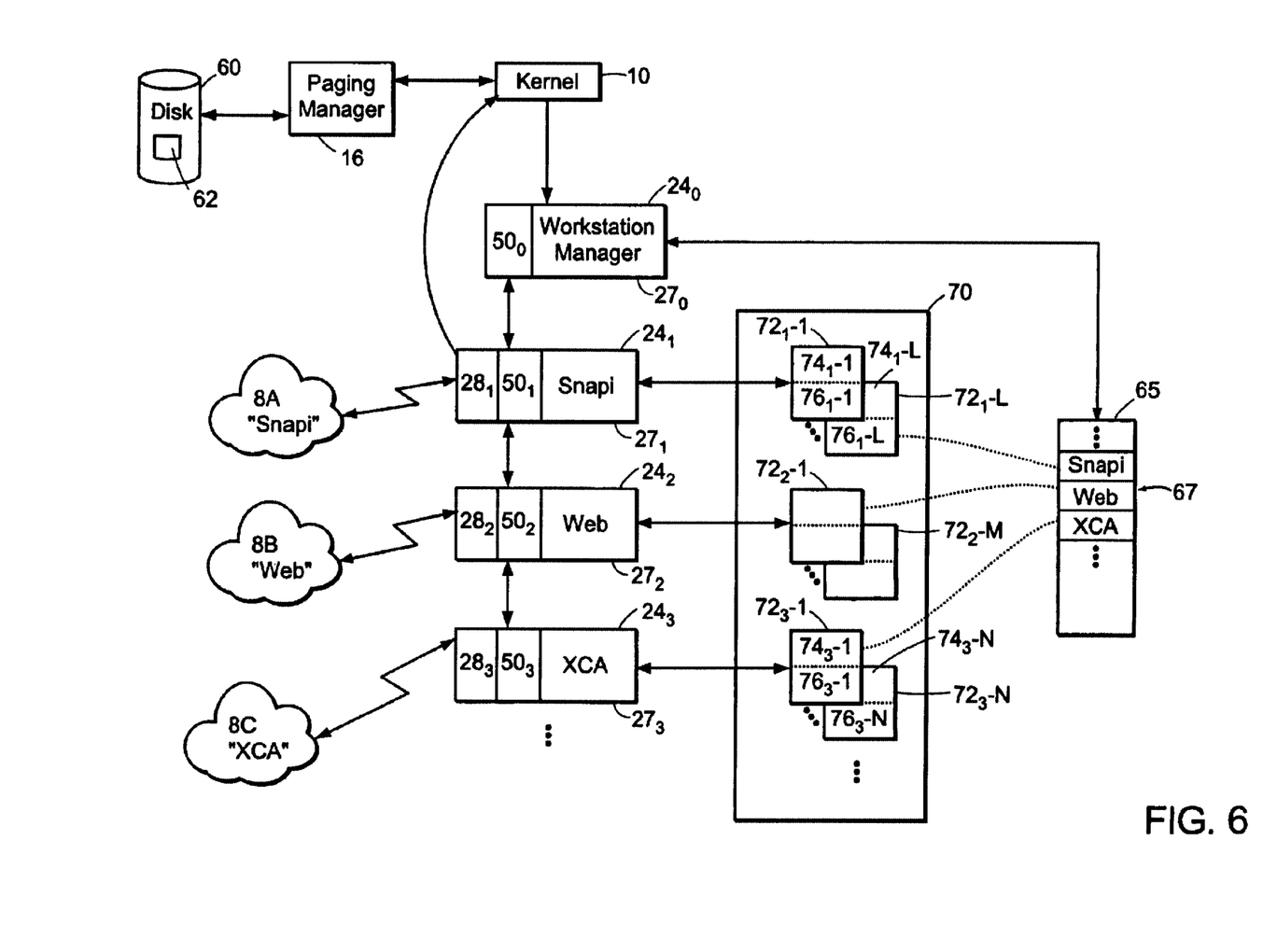
FIG. 6 is a schematic block diagram of a preferred context management system in accordance with the invention.

FIG. 6 is a schematic block diagram of a preferred context management system in accordance with the invention. Data is stored in a workspace structure 70 divided into workspace segments $72_1$-1, ..., $72_1$-L; $72_2$-1, ..., $72_2$-M; $72_3$-1, ..., $72_3$-N. Each workspace-enabled module $24_1$, $24_2$, $24_3$ can have a plurality of workspace segments 72, each with a private section 74 and public section 76. Particular details and advantages of the workspace structure 70 are described in U.S. patent application Ser. No. 08/866,619, entitled "Computing System For Implementing a Shared Cache" and filed on May 30, 1997 by James E. Carey, the teachings of which are incorporated herein by reference in their entirety.

The workspace structure 70 includes page buffers 74, 76 each having an associated page control block (PCB). Each page buffer 74, 76 holds a page of data read from storage 60. In accordance with a preferred embodiment of the invention, the page buffers 74,76 each store data in blocks of 4K bytes, defined as a page. It should be understood that the page size can be chosen to be either less than or greater than 4K bytes. The page control blocks include data fields used to control and access associated page buffers 74, 76. The workspace structure 70 is shared by the user sessions to store both public and private data.

It is important to note that there is no physical division between public and private data pages. That is, a particular page buffer 74, 76 simply stores a page of data, which can be either public or private data. It is up to the OLAP engine to logically separate public and private data pages.

A user session uses the above architecture by executing paging manager code. For data to be processed by a session, the data must be retrieved from mass storage 60 and stored in a page buffer 76 in the workspace segment 72. Once the data is retrieved, the page buffer 76 can be publicly accessed by any user session. If the data is to be modified, such as for a what-if analysis, then the data is copied to a private page buffer 74, leaving the original data in the public page buffer 76.

The kernel 10 communicates with a workspace manager module $24_0$ and a plurality of workspace-enabled modules $24_1, 24_2, 24_3, \ldots$ Each workspace segment 72 for a module persistently stores transaction data, but is only associated with a thread during the life of a transaction. A particular thread can access data stored in a group of workspace segments 72, one per workspace-enabled module in the context.

A prototypical workspace structure in ANSI C for a module is as follows:

```
typedef union ws_       /* union forces standard name for dereferences */
    {
    struct
        {                   /* WorkSpace for this module */
/***********Common to all workspace segments****************/
    usint32 Size;
    union
        {
        hmod modHandle;
        hws wsHandle;
        union ws_ **wsArray;
        };
    hType HandleType;
    clienttype client;
/***********Common to all workspace segments****************/
    int mymodulesvalue1;        /* Specific to this workspace segment */
    char mymodulestext1[256];   /* Specific to this workspace segment */
    mymodulesstruct mystruct;   /* Specific to this workspace segment */
        } WS;                   /* Common WorkSpace name */
    align junk;
    } ws;
```

Each workspace-enabled module has a common workspace interface, a workspace management interface, and a workspace constructor/destructor interface. Each interface includes a UUID and a structure definition that includes well-typed methods. The system maintains an instance of the common workspace interface for each workspace-enabled module. A common workspace callback interface is as follows:

```
/* UUID for this interface. */
#define COMMONWORKSPACE_ID
            {0x79BB2A60,0x144F,0x1069,0x84,0xEA,\
            {0x00, 0x00, 0xF6, 0x0E, 0x0D, 0xB6}}
/* Signature for this interface. */
    typedef const struct
        {
        ws *(*modCreateWs)(hws wsHandle,clienttype wsclienttype);
            bool(*modDestroyWs)(hws wsHandle);
            bool(*modQueryWorkspace)(const hws wsHandle);
        } ifCommonWorkSpace_1;
```

Figure 7:
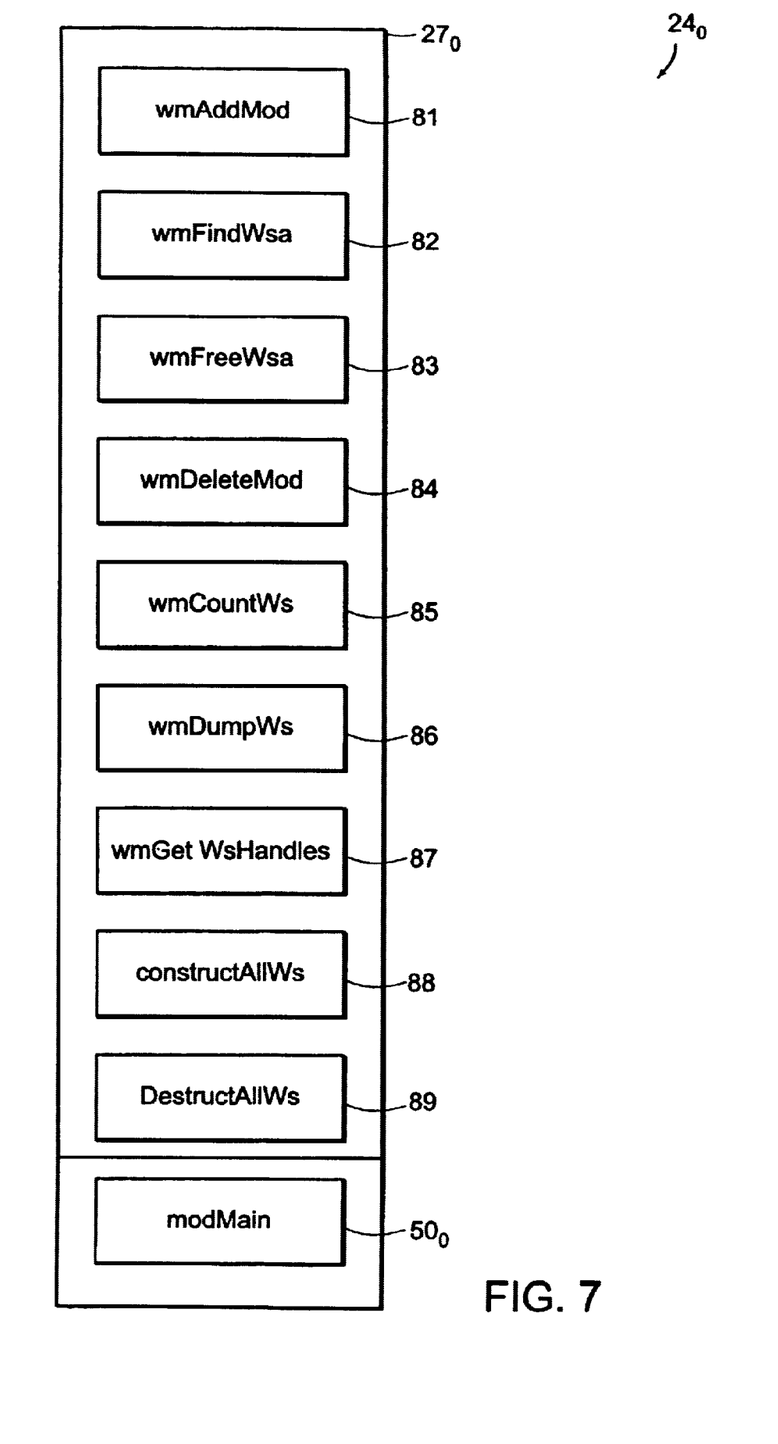
FIG. 7 is a schematic block diagram of a workspace manager module.

FIG. 7 is a schematic block diagram of a workspace manager module. The workspace manager $24_0$ includes a modMain method $50_0$ as described above and a plurality of manager methods $27_0$. The manager methods $27_0$ includes a wmAddMod method 81 to add a calling module to the workspace database 65 and a wmDeleteMod method 84 to remove a calling module from the workspace database 65. A wmFindWsa method 82 allocates the workspace array 67 in the workspace database 65 and a wmFreeWsa 83 deallocates the workspace array 67 for the current transaction. The constructAllWs method 88 and destructAllWs method 89 builds and shuts down the whole segmented workspace context for a session, respectively. During system startup, shutdown, and exception handling, the wmCountWs 85, wmDumpWs 86, and wmGetWsHandles 87 methods are used to navigate the deinitialize workspace segments.

A workspace management interface for all classes of modules is as follows:

```
/* UUID for this interface. */
#define WORKSPACEMGMT_ID {0x8D89A940,0x144F,0x1069,0x84, 0xED,
\{0x00, 0x00, 0xF6, 0x0E, 0x0D, 0xB6}}
/* Signature for this interface. */
    typedef const struct
        {
        bool(*wmAddMod)(const hmod modHandle, int *pmodWsIndex) ;
        ws **(*wmFindWsa)(const hws wsHandle);
        bool(*wmFreeWsa)(ws **embedded_const wsArray);
        bool(*wmDeleteMod)(const hmod modHandle);
        usint32(*wmCountWs)(const hmod modHandle);
        bool(*wmDumpWs)(const hws wsHandle, const hmod modHandle, char
*const target);
        usint32(*wmGetWsHandles)(hws wsHandleArray[], usint32 arraySize);
        } ifWorkSpaceMgmt_1;
```

A workspace construction/destruction interface for all classes of modules is as follows:

```
#define WSCONDESALL_ID {                \
                0x4ab5fec0,     \
                0x9b8b,         \
                0x11ce,         \
                0x8b,           \
                0x5b,           \
                {0x00, 0x60, 0x8c, 0x26, 0xef, 0x16} \
#define WSCONDESALL_NAME "WSConDesAll"
    typedef const struct
        {
        bool(*construcAllWs)(const hws wsHandle,clienttype wsclienttype);
        bool(*destructAllWs)(const hws wsHandle);
        } ifWSConDesAll_1;
```

Returning to FIG. 6, a user session is initiated by a client access of the workspace manager $24_0$. As illustrated, certain modules 24 function as listeners for specific interface protocols; e.g., Simplified New Application Programming Interface (SNAPI), Hypertext Transfer Protocol (HTTP), XCA, etc. By calling the kernel 10, the modules 24 can access data from the database using the paging manager 16 and store retrieved data in the appropriate workspace segment 72. In particular, clients 8A, 8B, 8C interact with the server 1 using a free-pool, threaded communications mechanism, such as Distributed Computing Environment/Remote Procedure Call (DCE/RPC), or Oracle Remote Operations. As illustrated there is a DCE/RPC listener $28_1$ for a SNAPI client 8A, an HTTP listener $28_2$ for a worldwide web client 8B, and an XCA socket listener $28_3$ for an XCA client 8C. These software items 28 listen for client transactions and hand over a client identifier to any thread in their thread-pool. The client identifier is immediately presented to the wmFindWsa method 82 in the workspace manager $24_0$, cast as a workspace session handle. An array of workspace segment pointers is returned and carried on the stack for all subsequent methods, allowing proper mapping of workspace data, for any method of any module in the server.

The workspace manager controls a workspace database 65 which includes an array of pointers 67 to workspace segments 72 in each context. The workspace array is preferably a double-linked list, accessible by session and segment values. During a session transaction, the client passes a context handle to the workspace manager. The context handle is a ticket which facilitates interaction between a client 8 and the workspace manager $24_0$. The context handle is passed with every function call and is put on the stack.

In response, the workspace manager $24_0$ retrieves the pointers from the workspace database 65 and returns them to the thread in a workspace array structure (WSADECL). To perform a query, or otherwise access data, the workspace array structure is passed into the modules. Based on the pointers, each module can determine which of its workspace segments to access.

As execution flows from module to module, each module's workspace index value is then used to dynamically dereference the local workspace segment pointer from the workspace database 65. The pointers 67 are placed such that their array location and their respective module workspace index value are synchronized. Furthermore, the pointer array 67 is presumed to be dense with no missing pointers during transaction processing, but can have missing elements during construction or destruction. In these two cases, the module workspace indexes determine the ordinality of construction and destruction, allowing for orderly construction counting up the index values and orderly destruction counting down the index values. Thus, modules can call methods of any other module with a lower index value during construction or destruction.

The workspace segment array 67 is guaranteed to be valid for the duration of the transaction, and returned to the workspace manager $24_0$ by the wmFreeWsa method 83 at the end of the transaction. The thread is then returned to the thread-pool by the communication mechanism.

Figure 8:
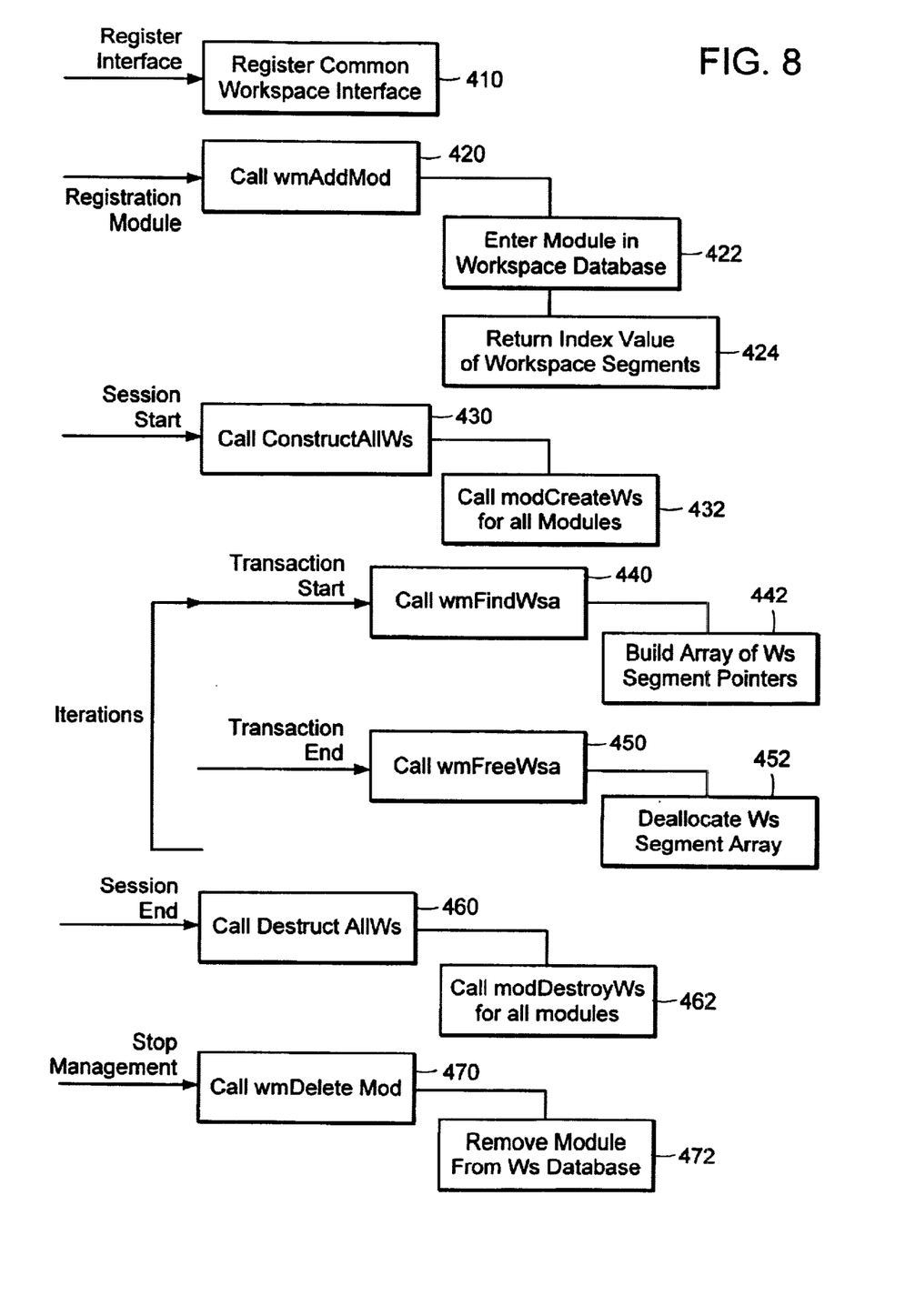
FIG. 8 is a process flow diagram for typical workspace operations within the host server computer 1 of FIG. 1.

FIG. 8 is a process flow diagram for typical workspace operations within the host server computer 1 of FIG. 1. First, after being loaded into memory by the server 1 as described above, each module registers its common workspace interface at step 410.

At step 420, the module calls the workspace manager's wmAddMod method 81 to register itself with the workspace manager as a workspace-enabled module. This enters the module in the workspace database 65 at step 422. Registration hands each module a unique index value representing the workspace segment associated with that module at step 424.

The server system, comprised of multiple, workspace-enabled modules, listens for client applications to begin sessions. At the beginning of each session, at step 430, the workspace manger's constructAllWs method 88 is called to build the whole, segmented workspace context, to support transactions on behalf of the client. The constructAllWs method 88 calls each module's modCreateWs method 54 (FIG. 4) at step 432 to construct session-level data. Construction can be polymorphic, based on values in the public portion of each workspace structure. For example, any module may tailor its workspace segment construction based on the data in the clienttype common workspace element. The result will be different behavior for the module's interface methods for each type of client using the software. Construction can be implemented via templates or code algorithms.

Each session typically iteratively starts and ends a plurality of transactions. Each transaction starts by calling the workspace manager's wmFindWsa method 82 at step 440. At step 442, this method builds an array of workspace segment pointers, ordered within the array by module index. Each transaction ends by calling the workspace manager's wmFreeWsa method 83 at step 450. At step 452, this method deallocates the workspace segment array.

The server system, again comprised of multiple, workspace-enabled modules, listens for client applications to end sessions. At the end of each session, at step 460, the workspace manager's destructAllWs method 89 is called to shut down the whole, segmented workspace context. Destruction can be implemented via code algorithms. At step 462, the destructAllWs method 89 calls each module's modDestroyWs method 55 (FIG. 4) at the end of the session to destruct session-level data.

At step 470, each module can stop workspace management for its segment by calling the workspace manager's wmDeleteMod method 84. Each module unregisters the common workspace interface at step 472 and can then unload itself from the process code image.

Returning briefly to FIG. 4, each module provides an integrity verification function for its workspace segment called modQueryWorkspace 57. When processing errors are detected by the server, each module's modQueryWorkspace method 57 is called to check the validity of the session data. If any, modQueryWorkspace method 57 returns a failure code, the session is deconstructed and the client is disconnected.

Throughout the code of each module, references to workspace data elements are wrapped in macros that make coding easy and compile in the proper workspace pointer dereferencing logic. For example, in program foo, in module1, that calls function foo2 in module 2 to process data and then return value foovalue, the prototypical code can be:

```
/* module1 */
/* workspace macros */
#define WSADECL         WS** wsArray
#define WSANAME         wsArray
#define WSADATA(x)      wsArray[modWsIndex]->WS.x
/* Signature for foo2iface interface. */
    typedef const struct
        {
        int foo2(WSADECL,int foovalue) ;/* prototype */
        } foo2iface__1 ;
foo2iface__1* piffoo2 ;/* resolved at system starup time */
int modWsIndex;   /* instantiated by wmAddMod */
int foo(WSADECL, userarg1)
{
    return(piffoo2->foo2(WSANAME,WSADATA(foovalue));
}
```

This code would then resolve to:

```
/* module1 */
/* Signature for foo2iface interface. */
    typedef const struct
        {
        int foo2(ws** wsArray,int foovalue);/* prototype */
        } foo2iface__1;
foo2iface__1* piffoo2;/* resolved at system starup time */
int modWsIndex;   /* instantiated by wmAddMod */
int foo(ws** wsArray, userarg1)
{
    return(piffoo2->foo2(wsArray,wsArray[modWsIndex]->WS.
        foovalue);
}
```

The above macro model supports both bound threads and free-thread embodiments of the invention. Using bound threads, the workspace manager can be compiled out of the system.

EQUIVALENTS

While the invention has been particularly shown and described with reference to preferred embodiments thereof, it will be understood to those skilled in the art that various changes in form and detail can be made without departing from the spirit and scope of the invention as defined by the appended claims. For example, although the invention has been described with reference to particular hardware and software embodiments, it will be understood that various aspects of the invention can be embodied in either hardware, software or firmware.

These and all other equivalents are intended to be encompassed by the following claims.

What is claimed is:

1. In a multi-session computing system, a system for managing a session context for a session comprising:

a computer program concurrently executable by a plurality of sessions, the computer program comprising a plurality of modules;

a workspace including a plurality of workspace segments accessible to the computer program for storing session data;

a database structure relating each session with at least one workspace segment to provide each session access to the stored session data; and a thread manager assigning computing threads to sessions.

2. The system of claim 1 wherein the database structure binds a module with a workspace segments.

3. The system of claim 1 wherein the modules are coupled in a preassigned order to yield the computer program.

4. The system of claim 1 wherein the sessions are initiated by a plurality of clients, a module providing an interface between the computer program and a client.

5. The system of claim 1 further comprising a free thread pool of computing threads managed by the thread manager.

6. The system of claim 1 wherein a workspace segment includes a private subset of data and a public subset of data.

7. The system of claim 1 wherein the database structure includes an array of pointers to all workspace segments.

8. The system of claim 1 further comprising a workspace database manager module for associating the database structure between the session data, the modules and the workspace segments.

9. The system of claim 8 wherein the association includes ordering pointers to a workspace segment with a pointer array, dependent on a module index value.

10. The system of claim 9 wherein the pointer array is indexed by a session value.

11. The system of claim 9 wherein the pointer array is indexed by a data segment value.

12. The system of claim 1 wherein the computing threads are pre-instantiated.

13. The system of claim 1 wherein there are fewer computing threads than sessions.

14. The system of claim 1 wherein each module includes an entry point referenceable by another module, the modules coupled together by a database of pointers to the entry points.

15. The system of claim 1 wherein each module having an entry point referenceable by another module, the modules coupled together by a database of pointers to the entry points.

16. The system of claim 1 wherein the modules are coupled without linking machine-code object files for the modules.

17. In a multi-session computing system, a method for managing a session context for a session, comprising:

building a computer program concurrently executable by a plurality of sessions, the computer program comprising a plurality of modules;

generating a workspace including a plurality of workspace segments accessible to the computer program for storing session data;

generating a database structure for relating each session with at least one workspace segment to provide each session access to the stored session data; and assigning computing threads to sessions from a thread manager.

18. The method of claim 17 further comprising binding a module with a workspace segment using the database structure.

19. The method of claim 17 wherein building a computer program comprises coupling the modules in a preassigned order to yield the computer program.

20. The method of claim 17 further comprising initiating the sessions by a plurality of clients, a module providing an interface between the computer program and a respective client.

21. The method of claim 17 further comprising managing a free thread pool of computing threads from the thread manager.

22. The method of claim 17 wherein a workspace segment includes a private subset of data and a public subset of data.

23. The method of claim 17 wherein the database structure includes an array of pointers to all workspace segments.

24. The method of claim 17 further comprising programming a workspace database manager module to associate the database structure between the session data, the modules and the workspace segments.

25. The method of claim 24 wherein the association includes ordering a plurality of pointers to workspace segments with a pointer array, dependent on a module index value.

26. The system of claim 5 wherein the pointer array is indexed by a session value.

27. The system of claim 5 wherein the pointer array is indexed by a data segment value.

28. The method of claim 17 wherein the computing threads are pre-instantiated.

29. The method of claim 17 wherein there are fewer computing threads than sessions.

30. The method of claim 17 wherein each module includes an entry pointer referenceable by another module, the modules coupled together by a database of pointers to the entry points.

31. An article of manufacture, comprising:

a computer-readable medium;

a computer-implemented method embodied in the computer readable medium to manage a session context for a session in a multi-session computing system, the method comprising:

building a computer program concurrently executable by a plurality of sessions, the computer program comprising a plurality of modules;

generating a workspace including a plurality of workspace segments accessible to the computer program for storing session data;

generating a data base structure for relating each session with at least one workspace segment to provide each session access to the stored session data; and assigning computing threads to sessions from a thread manager.

32. The article of claim 31 wherein the method further comprises binding a module with a workspace segment using the database structure.

33. The article of claim 31 wherein building a computer program comprises coupling the modules in a preassigned order to yield the computer program.

34. The article of claim 31 wherein the method further comprises initiating the sessions by a plurality of clients, a module providing an interface between the computer program and a respective client.

35. The article of claim 31 wherein the method further comprises managing a free thread pool of computing threads from the thread manager.

36. The article of claim 31 wherein a workspace segment includes a private subset of data and a public subset of data.

37. The article of claim 31 wherein the database structure includes an array of pointers to all workspace segments.

38. The article of claim 31 wherein the method further comprises programming a workspace database manager module to associate the database structure between the session data, the modules and the workspace segments.

39. The article of claim 38 wherein the association includes ordering a plurality of pointers to workspace segments on a pointer array, dependent on a modules index value.

40. The system of claim 33 wherein the pointer array is indexed by a session value.

41. The system of claim 33 wherein the pointer array is indexed by a data segment value.

42. The article of claim 31 wherein the computing threads are pre-instantiated.

43. The article of claim 31 wherein there are fewer computing threads than sessions.

44. The article of claim 31 wherein each module includes an entry point referenceable by another module, the modules coupled together by a database of pointers to the entry points.

45. In a multi-session computing system, a system for managing a session context for a session comprising:
    a computer program concurrently executable by a plurality of sessions;
    a workspace including plurality of workspace segments accessible to the computer program for storing session data;
    a database structure relating each session with at least one workspace segment to provide each session access to the stored session data; and
    a thread manager assigning computing threads to sessions from a free thread pool of computing threads.

46. The system of claim 45 wherein the computer program comprises a plurality of coupled modules, each module programmed with a subset of the computer program.

47. The system of claim 46 wherein the data base structure binds a module with a data segment.

48. The system of claim 46 wherein the modules are linked in a preassigned order to yield the computer program.

49. The system of claim 45 wherein the sessions are initiated by a plurality of clients, a module providing an interface between the computer program and a client.

50. The system of claim 45 wherein the computing threads are pre-instantiated in the free thread pool.

51. The system of claim 45 wherein a data segment includes a private subset of data and a public subset of data.

52. The system of claim 45 wherein the database structure includes an array of pointers to all workspace segments.

53. The system of claim 45 further comprising a workspace database manager module for associating the database structure between the session data, the modules the workspace segments.

54. The system of claim 53 wherein the association is provided by a computed index into a pointer array.

55. The system of claim 45 wherein there are fewer computing threads than sessions.

56. In a multi-session computing system, a method for managing a session context for a session, comprising:
    building a computer program concurrently executable by a plurality of sessions;
    generating a workspace including a plurality of workspace segments accessible to the computer program for storing session data;
    generating a database structure for relating each session with at least one workspace segment to provide each session access to the stored session data; and
    in a thread manager, assigning computing threads from a free thread pool of computing threads to sessions.

57. The method of claim 56 wherein building a computer program comprises coupling a plurality of modules together, each module programmed with a subset of the computer program.

58. The method of claim 57 further comprising binding a module with a workspace using the database structure.

59. The method of claim 57 wherein building a computer program comprises coupling the modules in a preassigned order to yield the computer program.

60. The method of claim 56 further comprising initiating the sessions by a plurality of clients, a module providing an interface between the computer program and a respective client.

61. The method of claim 56 further wherein the comprising threads are pre-instantiated in the free-thread pool.

62. The method of claim 56 wherein a data segment includes a private subset of data and a public subset of data.

63. The method of claim 56 wherein the database structure includes an array of pointers to all workspace segments.

64. The method of claim 56 further comprising programming a workspace database manager module to associate the database structure between the session data, the modules and the workspace segments.

65. The method of claim 64 wherein the association is provided by a computed index into a pointer array.

66. The method of claim 56 wherein there are fewer computing threads than sessions.

67. An article of manufacture, comprising:
    a computer-readable medium;
    a computer-implemented method embodied in the computer readable medium to manage a session context for a session in a multi-session computing system, the method comprising:
    building a computer program concurrently executable by a plurality of sessions;
    generating a workspace including a plurality of workspace segments accessible to the computer program for storing session data;
    generating a database structure for relating each session with at least one workspace segment to provide each session access to the stored session data; and
    in a thread manager, assigning computing threads from a thread pool of computing threads to sessions.

68. The article of claim 67 wherein building a computer program comprises coupling a plurality of modules together, each module programmed with a subset of the computer program.

69. The article of claim 68 wherein the method further comprises binding a module with a workspace segment using the database structure.

70. The article of claim 68 wherein building a computer program comprises coupling the modules in a preassigned order to yield the computer program.

71. The article of claim 67 wherein the method further comprises initiating the sessions by a plurality of clients a module providing an interface between the computer program and a respective client.

72. The article of claim 67 wherein the computing threads are pre-instantiated in the free thread pool.

73. The article of claim 67 wherein a workspace segment includes a private subset of data and public subset of data.

74. The article of claim 67 wherein the database structure includes an array of pointers to all workspace segments.

75. The article of claim 67 wherein the method further comprises programming a workspace database manager module to associate the database structure between the session data, the modules and the workspace segments.

76. The article of claim 75 wherein the association is provided by a computed index into a pointer array.

77. The article of claim 67 wherein there are fewer computing threads than sessions.

78. In a multi-session computing system, a system for managing a session context for a session comprising:

a computer program concurrently executable by a plurality of sessions, the computer program comprising a plurality of modules coupled in a preassigned order, without linking machine-code object files for the modules, to yield the computer program, one of the plurality of modules providing an interface between the computer program and a client;

a plurality of workspace segments accessible to the computer program for storing session data, each workspace segment including a private subset of data and a public subset of data;

a database structure relating each session with at least one workspace segment to provide each session access to the stored session data and binding a module with a workspace segment, the database structure including an array of pointers to all workspace segments;

a thread manager assigning computing threads to sessions initiated by a plurality of clients;

a free thread pool of computing threads managed by the thread manager; and     a workspace database manager module for associating the database structure between the session data, the modules and the workspace segments, the association including ordering pointers to a workspace segment with a pointer array, dependent on a module index value.

\* \* \* \* \*